United States Patent
Razavi Majomard et al.

(10) Patent No.: US 12,471,154 B1
(45) Date of Patent: Nov. 11, 2025

(54) SOFTWARE/FIRWARE UPDATES DURING NETWORK LINK ESTABLISHMENT

(71) Applicant: Marvell Asia Pte Ltd, Singapore (SG)

(72) Inventors: Seid Alireza Razavi Majomard, Belmont, CA (US); Ehab Tahir, Mississauga (CA); David Shen, Saratoga, CA (US)

(73) Assignee: Marvell Asia Pte Ltd, Singapore (SG)

( * ) Notice: Subject to any disclaimer, the term of this patent is extended or adjusted under 35 U.S.C. 154(b) by 755 days.

(21) Appl. No.: 17/828,958

(22) Filed: May 31, 2022

Related U.S. Application Data

(60) Provisional application No. 63/194,803, filed on May 28, 2021.

(51) Int. Cl.
- *H04W 76/10* (2018.01)
- *G06F 8/65* (2018.01)
- *H04W 48/16* (2009.01)
- *H04W 48/18* (2009.01)

(52) U.S. Cl.
CPC ............ *H04W 76/10* (2018.02); *G06F 8/65* (2013.01); *H04W 48/16* (2013.01); *H04W 48/18* (2013.01)

(58) Field of Classification Search
CPC ..... H04W 76/10; H04W 48/16; H04W 48/18; G06F 8/65
See application file for complete search history.

(56) References Cited

U.S. PATENT DOCUMENTS

| | | |
|---|---|---|
| 9,979,507 B1 | 5/2018 | Lo |
| 9,998,950 B2 | 6/2018 | Zhang et al. |
| 10,079,709 B2 | 9/2018 | Sun et al. |
| 2003/0002108 A1 | 1/2003 | Ames et al. |
| 2009/0154473 A1 | 6/2009 | Diab et al. |
| 2016/0241443 A1* | 8/2016 | Bidaralli ............. H04L 41/0889 |
| 2017/0063700 A1 | 3/2017 | Wang et al. |

(Continued)

FOREIGN PATENT DOCUMENTS

| | | |
|---|---|---|
| WO | 2016126175 A1 | 8/2016 |

OTHER PUBLICATIONS

IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," The Institute of Electrical and Electronics Engineers, Inc., Sections 1-5, 2695 pages (Dec. 9, 2005).

(Continued)

*Primary Examiner* — Cheikh T Ndiaye

(57) ABSTRACT

A link establishment process for establishing a network link between the first network interface device and a second network interface device is initiated at the first network interface device. During the link establishment process, the first network interface device receives from the second network interface device via the network link, one or more update messages requesting one or more changes to be applied at the first network interface device, the one or more changes for altering operation of one or both of software and firmware stored in one or more memories included in or coupled to the first network interface device. The one or more changes are applied based on the one or more update messages at the first network interface device.

22 Claims, 6 Drawing Sheets

(56) References Cited

U.S. PATENT DOCUMENTS

2020/0257518 A1\* 8/2020 Liedtke ................... G06F 8/65
2020/0278892 A1\* 9/2020 Nainar ................... H04L 67/10
2021/0143972 A1   5/2021 Mann

OTHER PUBLICATIONS

IEEE Std. 802.3bp™—2016, "IEEE Standard for Ethernet—Amendment 4: Physical Layer Specifications and Management Parameters for 1Gb/s Operation over a Single Twisted Pair Copper Cable," The Institute of Electrical and Electronics Engineers, Inc., 211 pages (Jun. 30, br2016).
International Search Report and Written Opinion in International Patent Application No. PCT/US2020/060293, mailed Mar. 9, 2021 (16 pages).

\* cited by examiner

_US 12,471,154 B1_

SOFTWARE/FIRWARE UPDATES DURING NETWORK LINK ESTABLISHMENT

CROSS REFERENCES TO RELATED APPLICATIONS

This application claims the benefit of U.S. Provisional Patent Application No. 63/194,803, entitled "Patching and Updating the Software/Configuration of an Ethernet PHY from the Remote Side of the Link," filed on May 28, 2021, the disclosure of which is hereby expressly incorporated herein by reference in its entirety.

FIELD OF TECHNOLOGY

The present disclosure relates generally to network interface devices, and more particularly to performing software and/or firmware updates in network interface devices.

BACKGROUND

Network interface devices, such as Ethernet physical layer (PHY) chips, typically execute software and/or firmware instructions to control operation of the devices. Sometimes software and/or firmware instructions in a network interface device need to be patched or updated after deployment of the network interface device. For example, software and/or firmware instructions on an Ethernet PHY chip sometimes need to be patched or updated after the Ethernet chip is deployed in another system or device, such as an end market device. Such updates, however, are often difficult to perform because the updates typically need to be provided through a vendor of the end market device. Thus, coordination is needed between the vendor of the network interface device and the vendor of the end market device. Such required coordination often causes significant time delays for implementing software/firmware updates after deployment of network interface device, or makes implementing software/firmware updates after deployment of network interface device not possible without physically replacing the network interface device. Moreover, the required coordination increases turnaround times on performing debugging of deployed network interface devices and limits debugging attempts that may be performed to discover problems and fixes in the deployed network interface devices. Further still, in some network interface devices, such as some Ethernet PHY chips, software and/or firmware instructions are stored in a memory in which instructions cannot be altered after deployment of the network interface device.

SUMMARY

In an embodiment, a method for updating configuration of a first network interface device comprises: initiating, at the first network interface device, a link establishment process for establishing a network link between the first network interface device and a second network interface device; receiving, at the first network interface device from the second network interface device via the network link during the link establishment process, one or more update messages requesting one or more changes to be applied at the first network interface device, the one or more changes for altering operation of one or both of i) software and ii) firmware stored in one or more memories included in or coupled to the first network interface device; and applying, based on the one or more update messages, the one or more changes at the first network interface device.

In another embodiment, a first network interface device comprises one or more memories storing instructions for operation of the first network interface device; and an update controller implemented on one or more integrated circuit (IC) devices, configured to: receive, from a second network interface device via a network link between the first network interface device and the second network interface device, one or more update messages requesting one or more changes to be applied at the first network interface device, the one or more changes for altering operation of one or both of i) software and ii) firmware stored in one or more memories included in or coupled to the first network interface device, the one or more update messages being received during a link establishment process for establishing the network link between the first network interface device and a second network interface device; and apply, based on the one or more update messages, the one or more changes at the first network interface device.

In yet another embodiment, a method for updating configuration of a first network interface device comprises: receiving, at the first network interface device from a second network interface device via a network link between the first network interface device and the second network interface device, one or more update messages requesting one or more changes to be applied at the first network interface device, the one or more changes for altering operation of one or both of i) software and ii) firmware stored in one or more non-volatile memories included in or coupled to the first network interface device; temporarily storing, by the first network interface device, the one or more changes in a volatile memory included in or coupled to the first network interface device; and applying, at the first network interface device, the one or more changes temporarily stored in the volatile memory included in or coupled to the first network interface device.

In still another embodiment, a first network interface device comprises: one or more non-volatile memories storing one or both of i) software and ii) firmware configured to control operation of the first network interface device; a volatile memory; and an update controller implemented on one or more integrated circuit (IC) devices, configured to: receive, from a second network interface device via a network link between the first network interface device and the second network interface device, one or more update messages requesting one or more changes to be applied at the first network interface device, the one or more changes for altering operation of one or both of i) the software and ii) the firmware stored in the one or more non-volatile read-only memories of the first network interface device; temporarily store the one or more changes in the volatile memory of the first network interface device; and apply the one or more changes temporarily stored in the volatile memory of the first network interface device.

DETAILED DESCRIPTION

Figure 1:
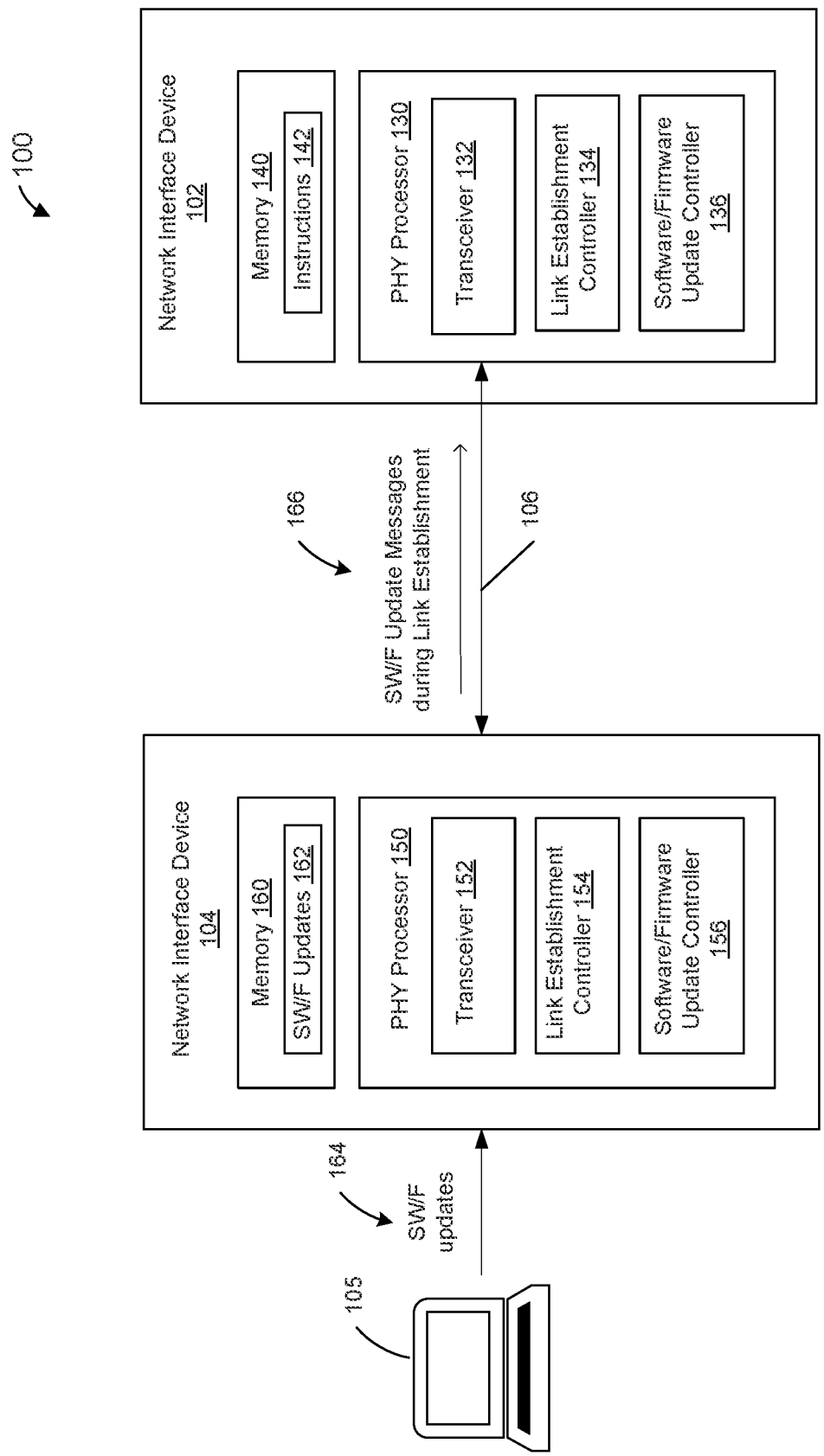
FIG. 1 is a simplified diagram of an example system that includes a first network interface device configured to receive software and/or firmware updates from a second network interface device via a network link during a link establishment process for establishing the network link, according to an embodiment.

As discussed above, provisioning of software and/or firmware updates to a network interface device, such as an Ethernet physical layer (PHY) chip, is often difficult or impossible after deployment of the network interface device because such software and/or firmware updates must be provisioned via a vendor that deploys the network interface device and/or because the network interface device is not equipped with memory that allows alteration of software and/or firmware instructions after deployment of the network interface device. In embodiments described below, software and/or firmware updates are provided to a first network interface device from a second network interface device over a network link between the first network interface device and the second network interface device, when the network link is being established between the first network interface device and the second network interface device. For example, one or more software and/or firmware update messages are transmitted to the first network interface device from the second network interface device over a network link between the first network interface device and the second network interface device during auto-negotiation and/or training phases of a link establishment process for establishing the network link between the first network interface device and the second network interface device.

Providing software and/or firmware updates to a first network interface device from a second network interface device over a network link during a link establishment process for establishing the network link allows for provisioning of software and/or firmware updates by a vendor of the first network interface device, after deployment of the first network interface device, without requiring provisioning of the software and/or firmware updates via a vendor that deploys the first network interface device. Providing software and/or firmware updates without requiring provisioning via a vendor that deploys the first network interface device facilitates debugging of software and/or firmware in the first network interface deice after deployment of the first network interface deice. For example, because the vendor of the first network interface device is able to more easily provide software and/or firmware updates to the first network interface device without involving the vendor that deploys the first network interface device, the number of potential patches that the vendor of the first network interface device is able to provide to the first network interface device is increased, turnaround time of trying various software and/or firmware patches is decreased, etc., in various embodiments. Moreover, in some embodiments, providing software and/or firmware updates to a first network interface device from a second network interface device over a network link during a link establishment process for establishing the network link allows for provisioning of software and/or firmware updates to network interface devices that cannot persistently store new software and/or firmware instructions, such as read-only memory (ROM) network interface devices that are not equipped with a memory to which software and/or firmware updates can be persistently written after deployment of the network interface device. Further still, in some embodiments, by providing software and/or firmware updates to the first network interface device 102 from the second network interface device 104 over the network link 106 during a training phase of establishing the network link 106 software/firmware updates, without which establishing the network link cannot be properly completed, can be provisioned in due time for establishing the network link, in some embodiments.

FIG. 1 is a simplified diagram of an example system 100 that includes a first network interface device 102 configured to receive software and/or firmware (sometimes referred to herein as "software/firmware") updates from a second network interface device 104 via a network link 106 during a link establishment process for establishing the network link 106, according to an embodiment. The first network interface device 102 is a network interface chip, such as an Ethernet physical layer (PHY) chip, provided by an Ethernet chip vendor and deployed in (e.g., integrated with) another device provided by a vendor other than the Ethernet chip vendor, in an embodiment. For example, the first network interface device 102 is integrated into a system, such as a board (e.g., a motherboard), provided by the vendor other than the Ethernet chip vendor. As a more specific example, the first network interface device 102 is an Ethernet PHY chip provided by an Ethernet chip vendor and integrated with an automotive accessory device, such as a camera or other sensor, provided by an automotive accessory device vendor other than the Ethernet chip vendor, in an embodiment. In some embodiments, the first network interface device 102 is integrated with a device for deployment in a network other than an automotive Ethernet network.

The second network interface device 104 is an Ethernet PHY chip integrated into a system, such as a board (e.g., a motherboard), provided by a vendor other than the Ethernet chip vendor, in an embodiment. As a more specific example, in an embodiment in which the first network interface device 102 is provided by an Ethernet chip vendor and integrated with an automotive accessory device provided by an accessory device vendor for deployment in an automobile, the second network interface device 104 is an Ethernet PHY chip provided by the Ethernet PHY chip vendor and integrated with a central controller device provided by a central controller device vendor for deployment in the automobile.

The network link 106 between the network interface device 102 and the network interface device 104 is a network link (e.g., an Ethernet link) for communication over a single twisted pair copper connection, in an embodiment. In another embodiment, the network link 106 is a network link (e.g., an Ethernet link) for communication over a suitable connection different from a single twisted pair copper connection. For example, the network link 106 is a network link (e.g., an Ethernet link) for communication over a multi-pair copper connection, an optical link, a fiber link, a radio frequency plastic waveguide link, etc., in various embodiments.

The first network interface device 102 includes one or more PHY processors 130 (sometimes referred to herein as "the PHY processor 130" for brevity). The PHY processor 130 includes a transceiver 132, a link establishment controller 134 and a software/firmware update controller 136. The first network interface device 102 also includes or is coupled to a memory device 140 storing software and/or firmware instructions 142. The memory device 140 is a single memory device or comprises multiple memory devices, in various embodiments. The memory device 140 includes one or more non-volatiles memories and one or more volatile memories, in an embodiment. For example, the memory device 140 includes one or more of a read-only memory (ROM), an electrically erasable programmable read-only memory (EEPROM), a flash memory, a random-access memory (RAM), a dynamic RAM (DRAM), etc. In an embodiment, the software and/or firmware instructions 142 are persistently stored in one or more non-volatile memories of the memory device 140. In some embodiments, the software and/or firmware instructions 142 are persistently stored in a read-only memory in the memory device 140. In some embodiments, the network interface device 102 does not include a writable flash or other writable memory for persistently storing software and/or firmware instructions. For example, the first network interface device 102 is configured to be deployed in an automotive accessory device, such as a camera or other sensor, that benefits from lower cost, size, power consumption etc., of not employing writable flash or other writable memory for persistently storing software and/or firmware instructions.

The software and/or firmware instructions 142 include software and/or firmware instructions that, when implemented by one or more processors of the network interface device 102, cause the one or more processors to control operation of components of the network interface device 102, such as operations of the PHY processor 130 of the first network interface device 102. For example, the software and/or firmware instructions 142 include instructions for configuring various settings in the PHY processor 130, such as various PHY modes of the PHY processor 130, PHY parameters utilized by the PHY processor 130, instructions for performing various routines supported by the PHY processor 130, etc., in various embodiments.

The second network interface device 104 includes one or more physical layer (PHY) processors 150 (sometimes referred to herein as "the PHY processor 150" for brevity). The PHY processor 150 includes a transceiver 152, a link training controller 154 and a software/firmware update controller 156. The second network interface device 104 also includes or is coupled to a memory device 160 storing software/firmware updates 162, in some embodiments. The memory device 160 is a single memory device or the memory device 160 comprises multiple memory devices, in various embodiments. The memory device 160 includes one or more of a read-only memory (ROM), an electrically erasable programmable read-only memory (EEPROM), a flash memory, a random-access memory (RAM), a dynamic RAM (DRAM), etc. The software/firmware updates 162 include software/firmware updates for updating software and/or firmware in the first network interface device 102, in an embodiment. The software/firmware updates 162 include new software and/or firmware instructions to be implemented by the first network interface device 102, new software and/or firmware code to be implemented by the first network interface device 102, software and/or firmware patches to be implemented by the first network interface device 102, new settings and/or parameters to be applied by software and/or firmware in the first network interface device 102, etc., in some embodiments. In some embodiments, the software/firmware updates 162 additionally or alternatively include other information needed for the software and/or firmware in the first network interface device 102 to properly control the first network interface device 102 for communicating over the network link 106. For example, the software/firmware updates 162 include an address, such as a medium access control (MAC) address, to the used by the software and/or firmware in the first network interface device 102 for communicating over the network link 106. The second network interface device 104 is configured to provide the software/firmware updates 162 to the first network interface device 102 over the network link 106 during a link establishment process for establishing the network link 106, in an embodiment. In some embodiments, the second network interface device 104 is configured to provide the software/firmware updates 162 to the first network interface device 102 over the network link 106 during a link establishment process for establishing the network link 106 each time the network link 106 is established between the first network interface device 102 and the second network interface device 104. Providing the software/firmware updates 162 from the second network interface device 104 to the first network interface device 102 over the network link 106 during a link establishment process each time the network link 106 is established between the first network interface device 102 and the second network interface device 104 allows for provisioning of software/firmware updates to the first network interface device 102 in an embodiment in which the software and/or firmware instructions 142 are stored in non-volatile memory of the memory device 140 included in or coupled to the first network interface device 102. For example, providing the software/firmware updates 162 from the second network interface device 104 to the first network interface device 102 over the network link 106 during a link establishment process each time the network link 106 is established between the first network interface device 102 and the second network interface device 104 allows for the software/firmware updates 162 to be temporarily stored in a volatile memory included in or coupled to the first network interface device 102 and to be utilized by the network interface device 102 until power-down of the network interface device 102, for example.

Additionally or alternatively, in some embodiments, the second network interface device 104 is integrated into, or communicatively coupled to, a computing device 105 configured to enable testing, diagnosing, debugging, providing updates (e.g., patches) to et., software and/or firmware in network interface devices such as the first network interface device 102. In this embodiment, the second network interface device 104 is configured to receive software/firmware updates 164 (e.g., new software and/or firmware instructions, new software and/or firmware code, software and/or firmware patches, etc.) from the computing device 105, for example when debugging of the software and/or firmware 142 is being performed using the computing device 105. The software/firmware updates 164 include software/firmware updates in the form of new software and/or firmware instructions to be implemented by the first network interface device 102, new software and/or firmware code to be implemented by the first network interface device 102, software and/or firmware patches to be implemented by the first network interface device 102, new settings and/or parameters to be applied by software and/or firmware in the first network interface device 102 etc., for debugging and/or updating software and/or firmware in the first network interface device 102, in some embodiments. The second network interface device 104 is configured to provide the software and/or firmware updates 164 received from the computing device 105 to the first network interface device 102 over the network link 106 during a link establishment process for establishing the network link 106, in such embodiments. In some such embodiments, the second network interface device 104 omits the software and/or firmware updates 162 from memory device 160.

The software/firmware update controller 156 of the second network interface device 104 is configured to provide software/firmware updates 162 and/or software/firmware updates 164 to the first network interface device 104 over the network link 106 during a link establishment process for establishing the network link 106 between the first network interface device 102 and the second network interface device 104. In an embodiment, the link establishment process for establishing the network link 106 includes an auto-negotiation phase and a training phase that follows the auto-negotiation phase. During the auto-negotiation phase, the first network interface device 102 and the second network interface device 104 exchange capabilities, such as transmission speeds supported by the first network interface device 102 and the second network interface device 104, PHY modes supported the first network interface device 102 and the second network interface device 104, etc. Based on the capabilities exchanged during the auto-negotiation phase of the link establishment process, the first network interface device 102 and the second network interface device 104 select or otherwise determine PHY parameters to be used for communication between the first network interface device 102 and the second network interface device 104. For example, the first network interface device 102 and the second network interface device 104 select a highest transmission speed supported by both the first network interface device 102 and the second network interface device 104. The first network interface device 102 is configured to configure the PHY processor 130 to operate with the PHY parameters determined based on the capabilities exchanged during the auto-negotiation phase of the link establishment process, in an embodiment. For example, the first network interface device 102 is configured to write to one or more registers included in or otherwise accessible by the PHY processor 130 to configure the PHY processor 130 to utilize the speed, the PHY mode, etc., determined based on the capabilities exchanged during the auto-negotiation phase of the link establishment process, in an embodiment. Similarly, the second network interface device 104 is configured to configure the PHY processor 150 to operate with the PHY parameters determined based on the capabilities exchanged during the auto-negotiation phase of the link establishment process, in an embodiment. For example, the second network interface device 104 is configured to write to one or more registers included in or otherwise accessible by the PHY processor 150 to configure the PHY processor 150 to utilize the speed, the PHY mode, etc., determined based on the capabilities exchanged during the auto-negotiation phase of the link establishment process, in an embodiment. In some embodiments, the link establishment process for establishing the network link 106 omits the auto-negotiation phase. For example, in some automotive applications, the auto-negotiation phase is omitted in order to speed up the link establishment process to meet stringent link start-up requirements. In some such embodiments, the PHY processor 130 of the first network interface device 102 and the PHY processor 150 of the second network interface device are pre-configured to operate with particular PHY parameters, such as particular transmission speed, particular PHY mode, etc.

The training phase of the link establishment process follows the auto-negotiation phase and is performed using the PHY parameters determined based on the capabilities exchanged during the auto-negotiation phase, in an embodiment. For example, the training phase of the link establishment process is performed using the transmission speed determined based on the capabilities exchanged during the auto-negotiation phase, in an embodiment. During the training phase, the first network interface device 102 and the second network interface device 104 exchange training signals for synchronization between the first network interface device 102 and the second network interface device 104. The transmission speed used for transmission of signals during the auto-negotiation phase is relatively lower as compared to the transmission speed used for transmission of signals during the auto-negotiation phase, in an embodiment. Transmission of signals during the auto-negotiation phase at the relatively lower speed is generally more resilient to noise, in at least some embodiments. In some embodiments, in which the link establishment process does not include auto-negotiation, the training phase of the link establishment process is performed using pre-configured PHY parameters, such as pre-configured transmission speed.

The software/firmware update controller 156 of the second network interface device 104 is configured to provide the software/firmware updates 162 and/or software/firmware updates 164 to the first network interface device 104 over the network link 106 during an auto-negotiation phase and/or during a training phase of the link establishment process for establishing the network link 106, in various embodiments. Providing at least a portion of the software/firmware updates 162 and/or software/firmware updates 164 to the first network interface device 104 during the auto-negotiation phase of the link establishment process takes advantage of the slower, more resilient signals transmitted during the auto-negotiation phase of the link establishment process as compared to signals transmitted at faster transmission speeds during the training phase of the link establishment process, in at least some embodiments. Moreover, providing at least a portion of the software/firmware updates 162 and/or software/firmware updates 164 to the first network interface device 104 during the auto-negotiation phase of the link establishment process allows for provisioning of software/firmware updates that are needed in order to complete the auto-negotiation phase of the link establishment process, in an embodiment. On the other hand, providing at least a portion of the software/firmware updates 162 and/or software/firmware updates 164 to the first network interface device 104 during the training phase of the link establishment process takes advantage of relatively faster transmission speeds used for transmission of signals during the training phase of the link establishment process, in at least some embodiments. Further, providing at least a portion of the software/firmware updates 162 and/or software/firmware updates 164 to the first network interface device 104 during the training phase of the link establishment process allows for provisioning of software/firmware updates that are needed in order to complete the training phase of the link establishment process, in an embodiment.

In an embodiment, software/firmware update controller 156 of the second network interface device 104 is configured to generate one or more update messages 166 based on the software/firmware updates 162 and/or software/firmware updates 164. The one or more update messages 166 include software and/or firmware updates for controlling operation of one or more components of the first network interface device 102, such as the PHY processor 130 of the first network interface device 102, in an embodiment. For example, the update messages 166 include new software and/or firmware instructions to be used for controlling operation of the PHY processor 130, new PHY settings and/or PHY parameter values to be used by the PHY processor 130, etc., in various embodiments. In some embodiments, the update messages 166 additionally include indications of times when the software/firmware updates are to be utilized by the PHY processor 130. For example, the update messages 166 indicate that a software/firmware update is to be applied during the link establishment process for establishing the network 106 (e.g., during the auto-negotiation phase of the link establishment process, during the training phase of the link establishment process, at the next training signal, etc.), at a beginning of a data mode for communication over the network link 106 after completion of establishment of the network link 106, etc., in various embodiments. In an embodiment, a particular update messages 166 includes i) an indication of a PHY parameter to be updated at the first network interface device ii) a new value for the PHY parameter to be applied at the first network interface device and iii) an indication of a time at which the new value is to be applied at the first network interface device. In some embodiments, the update messages 166 additionally or alternatively include indications of specific software and/or firmware routines, software and/or firmware versions, etc., to which the software/firmware update is to be applied at the first network interface device 102. For example, in an embodiment, an update message 166 instructs the first network interface device to interrupt normal link establishment process and to execute one or more software and/or firmware routines to obtain measurements (e.g., signal strength measurements, signal to noise measurements, etc.) based, for example, on training signals transmitted from the second network interface device 104 to the first network interface device 102 via the network link 106, and to transmit measurement results to the second network interface device 104 to be used for debugging purposes, for example. In some embodiments, the update messages 166 additionally or alternatively include other information needed for software and/or firmware to properly control operation of the first network interface device 102, such as a MAC address needed by the network interface device 102 for communication over the network link 106.

The software/firmware update controller 156 is configured to provide the one or more update messages 166 to the link establishment controller 154, in an embodiment. The link establishment controller 154 is configured to generate one or more signals that include the one or more update messages 166, and to provide the one or more signals to the transceiver 152 for transmission to the first network interface device 102 via the network link 106 during a link establishment process for establishing the network link 106. In an embodiment and/or scenario, the link establishment controller 154 is configured to generate one or more auto-negotiation signals, to encode one or more update messages 166 onto the one or more auto-negotiation signals, and to provide the one or more auto-negotiation signals to the transceiver 152. The transceiver 152 is configured to transmit the one or more auto-negotiation signals encoded with the one or more update messages 166 to the first network interface device 102 via the network link 106 during the auto-negotiation phase of the link establishment process for establishing the network link 106, in an embodiment. In another embodiment and or scenario, the link establishment controller 154 is configured to generate one or more training frames, to include one or more update messages 166 in the one or more training frames, and to provide the one or more training frames to the transceiver 152. The transceiver 152 is configured to transmit the one or more training frames that include the one or more update messages 166 to the first network interface device 102 via the network link 106 during a training phase of the link establishment process for establishing the network link 106. In an embodiment, the link establishment controller 154 is configured to generate a training frame to include i) one or more training signals that allow the first network interface device 102 to synchronize with the second network interface device 104 and ii) one or more update messages 166. In an embodiment, the link establishment controller 154 is configured to include the one or more update messages 166 in one or more information fields (InfoFields) defined for exchange of information between link partners by current Ethernet communication protocols. For example, in an embodiment, the InfoFields defined for exchange of information between link partners by current Ethernet communication protocols are redefined or customized for transmission of updates during link training between link partners such as the first network interface device 102 and the second network interface device 104. In other embodiments, the second network interface device 104 is configured to transmit the update messages 166 to the first network interface device 102 via the network link 106 during the link establishment process for establishing the network link 106 in other suitable manners.

The PHY processor 130 of the first network interface device 102 is configured to receive (e.g., the transceiver 132 is configured to receive) the one or more update messages 166 transmitted by the second network interface device 104, and to provide the one or more update messages 166 to the software/firmware update controller 136. The software/firmware update controller 136 is configured to update software and/or firmware in the first network interface device 102 based on the one or more update messages 166. In an embodiment, the software/firmware update controller 136 is configured to convert the one or more update messages 166 to a software update (e.g., a software patch) and/or a firmware update (e.g., a firmware patch) that includes new software and/or firmware instructions to be used by the first network interface device 102 for operation of the PHY processor 130, new PHY parameter values to be used by the first network interface device 102 for operation of the PHY processor 130, etc. The software/firmware update controller 136 is configured to write the new software and/or firmware instructions to the memory 140, for example by re-writing one or more software and/or firmware instructions 142 in the memory 140 with the new software and/or firmware instructions, new PHY parameters, etc., in an embodiment. Alternatively, in an embodiment in which the network interface device 102 is a flash-less or ROM-only device in which the software and/or firmware instructions 142 stored in a non-volatile memory of the memory device 140 cannot be directly altered, the software/firmware update controller 136 is configured to store the new software and/or firmware instructions in a volatile memory of the memory device 140, and to direct the PHY processor 130 to execute the new software and/or firmware instructions from the volatile memory. For example, in an embodiment, the PHY processor 130 is configured to utilize a jump table or other control table stored in a writable memory in the memory device 140 to direct state machine execution of the software and/or firmware instructions in the memory device 140. In this embodiment, the software/firmware update controller 136 is configured to, in connection with temporarily storing the new software and/or firmware instructions in a volatile memory in the memory device 140, update the jump or control table to direct the PHY processor to execute the new the new software and/or firmware instructions from the volatile memory at appropriate time(s) during the state machine execution of the software and/or firmware instructions in the memory device 140. In such embodiments, the new software and/or firmware instructions are temporarily utilized by the first network interface device 102, for example for completion of the link establishment of the network link 106 and/or in data mode after link establishment of the network link 106 and are removed from the first network interface device 102 after power down, for example.

Providing software and/or firmware updates to the first network interface device 102 from the second network interface device 104 over a network link during establishment of the network link allows for provisioning of software and/or firmware updates without involving the vendor that deploys the first network interface device 102, in at least some embodiments. Providing software and/or firmware updates to the first network interface device 102 without involving the vendor that deploys the first network interface device 104 facilitate debugging of software and/or firmware in the first network interface device 102 after deployment of the first network interface deice, in various embodiments. For example, because the vendor of the first network interface device 102 is able to more easily provide software and/or firmware updates to the first network interface device 102 without involving the vendor that deploys the first network interface device 102, the vendor of the first network interface device 102 potentially is able to provide a greater number of patches to the first network interface device 102, as well as decrease the turnaround time of trying various software and/or firmware patches in the first network interface device 102, etc., in various embodiments. Moreover, in some embodiments, providing software and/or firmware updates to the first network interface device from the second network interface device 104 over the network link 106 during establishment of the network link establishing the network link allows for provisioning of software and/or firmware updates to the first network interface device 102 in an embodiment in which the first network interface device 102 is not equipped with a memory to which software and/or firmware updates can be persistently written after deployment of the network interface device. Further still, in some embodiments, providing software and/or firmware updates to the first network interface device 102 from the second network interface device 104 over the network link 106 during a training phase of establishing the network link 106 allows for provisioning of software/firmware updates without which establishing the network link cannot be properly completed, in some embodiments.

In some embodiments, the first network interface device 102 and/or the second network interface device 104 are configured to employ one or more security features to authenticate the update messages 166 and to ensure that the update messages 166 are securely and authentically provided to the first network interface device 102. For example, in an embodiment, a key (e.g., an authentication key or a security key) is provided for encryption of update messages 166 at the second network interface device 104 and decryption of the update messages 166 at the first network interface device 102. In an embodiment, the second network interface device 104 encrypts the update messages 166 using the key prior to transmission of the update messages 166 over the network link 106 to the first network interface device 102. When the first network interface device 102 receives an update message 166 over the network link 106 from the second network interface device 104, the first network interface device 102 decrypts the update message 166 using the key. Based on properly decrypting the update message 166, the first network interface device 102 determines that the update message 166 was transmitted by a trusted source, thereby authenticating the update message 166. In other embodiments, other suitable authentication techniques are utilized to authenticate the update messages 166. In some embodiments, the first network interface device 102 is configured to perform testing of the software/firmware updates provided in the update messages 166 to ensure that updated software and/or firmware instructions do not jeopardize essential operation of components (e.g., the PHY processor 130) at the first network interface device 102.

Figure 2:
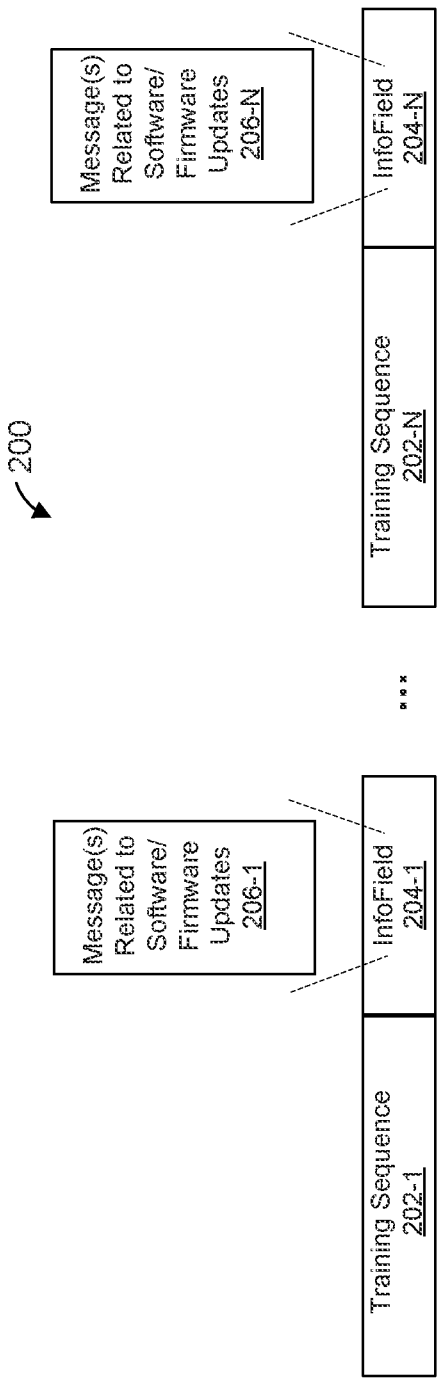
FIG. 2 is a block diagram of an example training frame that includes software and/or firmware update messages, according to an embodiment.

FIG. 2 is a diagram depicting a training frame 200 that includes software and/or firmware update messages, according to an embodiment. In an embodiment, training frames such as the training frame 200 are exchanged during link training performed between the first network interface device 102 and the second network interface device 104 in the system 100 of FIG. 1, and the training frame 200 is described with reference to FIG. 1 for ease of explanation. In other embodiments, training frames such as the training frame 200 are exchanged during link training between devices different from the first network interface device 102 and the second network interface device 104 in the system 100 of FIG. 1 and/or in systems different from the system 100 of FIG. 1.

In an embodiment, the second network interface device 104 is configured to generate the training frame 200 to include one or more update messages and to transmit the training frame to the first network interface device 102 via the network link 106 during a training phase of establishing the network link 106. The first network interface device 102 is configured to receive the training frame 200 transmitted by the second network interface device 104 via the network link 106 during the training phase of establishing the network link 106 and to process the one or more update messages in the training frame 200, in an embodiment. In an embodiment, the first network interface device 102 is configured to generate the training frame 200 to include one or more acknowledgement messages to acknowledge receipt of the one or more software update messages, and to transmit the training frame 200 to the second network interface device 104 via the network link 106 during the training phase of establishing the network link 106. The second network interface device 104 is configured to receive the training frame 200 transmitted by the first network interface device 102 via the network link 106 during the training phase of establishing the network link 106 and to process the one or more acknowledgement messages in the training frame 200 to determine that the first network interface device successfully received the one or more software update messages, in an embodiment.

The training frame 200 includes one or more training sequences 202 and one or more information fields (InfoFields) 204. The one or more training sequence fields 202 include one or more training sequences that enable the first network interface device 102 to synchronize with the second network interface device 104. The one or more InfoFields 204 are utilized to transmit information related to software/ firmware updates in the first network interface device 102, in an embodiment. The one or more InfoFields 204 correspond to InfoFields defined for exchange of information during training by current Ethernet protocols, in an embodiment. In an embodiment, the one or more InfoFields 204 correspond to InfoFields defined for exchange of information during training by current Ethernet protocols are re-defined or customized for transmission of information related to software/firmware updates, in an embodiment. The one or more InfoFields 204 include messages 206-1 related to software/firmware updates in the first network interface device 102, in various embodiments. For example, in an embodiment in which the training frame 200 is generated by the second network interface device 104 and transmitted to the first network interface device 102, the one or more messages 206-1 include the one or more update messages 166. In some embodiments in which the training frame 200 is generated by the second network interface device 104 and transmitted to the first network interface device 102, the one or more messages 206-1 include additional messages related to software/firmware updates in the first network interface device 102, such as a update request message indicating that the second network interface device 104 intends to initiate transmission of the one or more update messages 166 to the first network interface device 102, an update end message indicating that the second network interface device 104 has completed transmission of the one or more update messages 166 to the first network interface device 102, etc. In an embodiment in which the training frame 200 is generated by the first network interface device 102 and transmitted to the second network interface device 104, the one or more InfoFields 204 include respective one or more acknowledgement messages to acknowledge successful receipt of the one or more update messages from the second network interface device 104.

Figure 3:
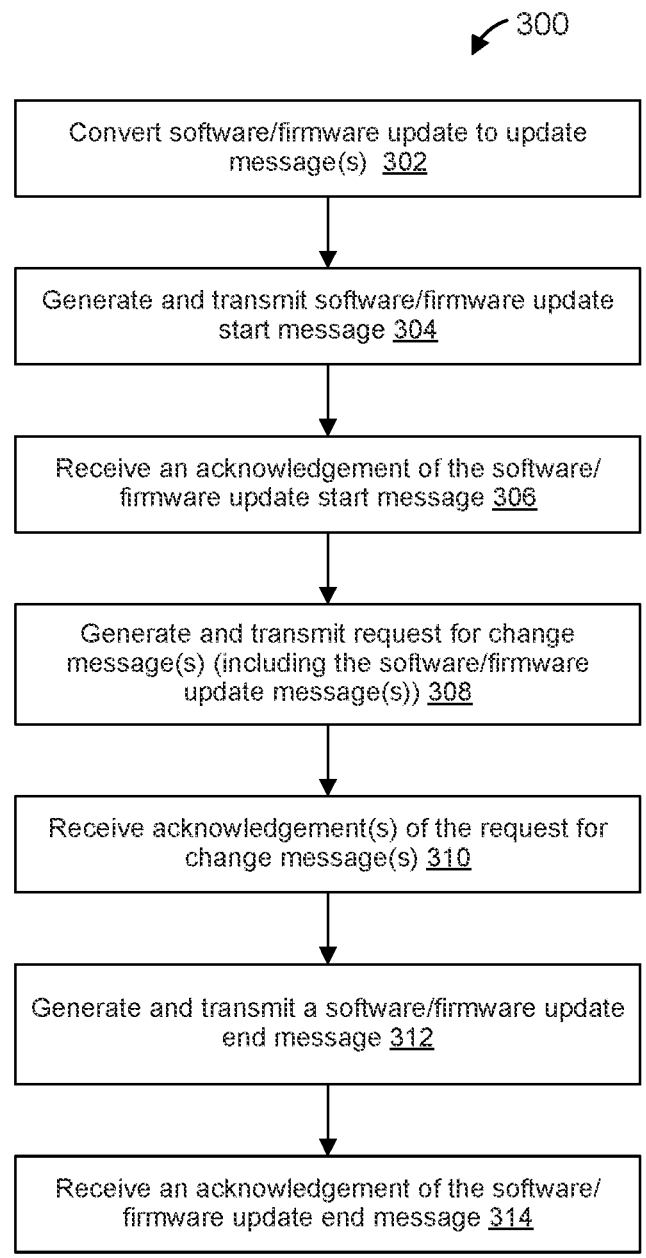
FIG. 3 is a flow diagram of an example method for transmitting software and/or firmware updates to a first network interface device from a second network interface device over a network link during a link establishment process for establishing the network link, according to an embodiment.

FIG. 3 is a diagram of an example method 300 for transmitting software/firmware updates to a first network interface device from a second network interface device over a network link during a during a link establishment process for establishing the network link, according to an embodiment. In an embodiment, the method 300 is implemented by the second network interface device 104 of the system 100 of FIG. 1, and the method 300 is described with reference to FIG. 1 for ease of explanation. In other embodiments, the method 300 is implemented by a suitable network interface device different from the second network interface device 104 of FIG. 1 and/or in a system different from the system 100 of FIG. 1.

At block 302, the second network interface device 104 converts a software/firmware update to one or more update messages to be transmitted to a first network interface device. In an embodiment, the second network interface device 104 converts, to the one or more update messages, the software/firmware update 166 received by the second network interface device 104 from the computing device 105 for testing, diagnosing, debugging, providing updates (e.g., patches) to etc., software and/or firmware in network interface devices such as the first network interface device 102. In another embodiment, the second network interface device 104 converts, to the one or more update messages, the software/firmware update 162 that is stored in the memory 160 of the second network interface device 104 for provisioning to the first network interface device 102 each time a network link is established between the second network interface device 104 and the first network interface 102, such as in an embodiment in which the first network interface device 102 is a flash-less or ROM-only network interface device. In some embodiments, the software/firmware update 162 is stored in the memory 160 of the second network interface device 104 in the form of update messages for transmission to the first network interface device 102. In this embodiment, the second network interface device 104 retrieves the software/firmware update 162 from the memory 160 for transmission without further converting the software/firmware update 162 to update messages.

At block 304, the second network interface device 104 generates and transmits an update request message to the first network interface device 102. The update request message indicates to the first network interface device 102 that the second network interface device 104 intends to initiate transmission of a software/firmware update to the first network interface device. In an embodiment, the update request message is encoded in an auto-negotiation signal generated by the second network interface device 104 and transmitted to the first network interface device 102 during an auto-negotiation phase of link establishment of the network link. In another embodiment, the update message is included in a field (e.g., an InfoField) of a training frame generated by the second network interface device 104 and transmitted to the first network interface device 102. For example, the software/firmware start message is included in an InfoField field 204 of the training frame 200 of FIG. 2, in an embodiment. In another embodiment, the software/firmware start message is transmitted from the second network interface device to the first network interface device in other suitable manners.

At block 306, the second network interface device 104 receives, from the first network interface device 102 via the network link 106, an acknowledgement message indicating that the software/firmware start message transmitted by the second network interface device 104 at block 304 was successfully received by the first network interface device 102. In an embodiment, the acknowledgement message is included in a field (e.g., an InfoField) of a training frame received by the second network interface device 104 from the first network interface device 102. For example, the acknowledgement message is included in an InfoField field 204 of the training frame 200 of FIG. 2, in an embodiment. In another embodiment, the acknowledgement message is transmitted from the first network interface device 102 to the second network interface device in other suitable manners. In some embodiments, the first network interface device 102 need not acknowledge successful receipt of the software/firmware start message, and block 306 is therefore omitted.

At block 308, the second network interface device generates and transmits one or more software/firmware update request messages to the first network interface device. The one or more software/firmware update request messages include the update messages generated at block 302, in an embodiment. In an embodiment, the one or more software/firmware update request messages are included in one or more fields (e.g., one or more InfoFields) of one or more training frames generated by the second network interface device and transmitted to the first network interface device. For example, the one or more software/firmware update request messages are included in one or more InfoFields 204 of the training frame 200 of FIG. 2, in an embodiment. In another embodiment, the one or more software/firmware update request messages are transmitted from the second network interface device to the first network interface device in other suitable manners.

At block 310, the second network interface device 104 receives, from the first network interface device 104 via the network link 106, one or more acknowledgement messages indicating that the one or more software/firmware update request messages transmitted by the second network interface device 104 at block 308 were successfully received by the first network interface device 102. In an embodiment, the one or more acknowledgement messages are included in one or more fields (e.g., one or more InfoFields) of one or more training frames received by the second network interface device 104 from the first network interface device 102. For example, in an embodiment, the one or more acknowledgement messages are included in one or more InfoFields 204 of the training frame 200 of FIG. 2. In another embodiment, the one or more acknowledgement messages are transmitted to the second network interface device 104 from the first network interface device 102 in other suitable manners. In some embodiments, the first network interface device 102 need not acknowledge successful receipt of the one or more software/firmware update request messages, and block 310 is therefore omitted.

At block 312, after completion of transmission of the software and/or firmware update to the second network interface device 104, the second network interface device generates 104 generates and transmits a software/firmware update end message to the first network interface device 102. The software/firmware end message indicates that the second network interface device 104 has completed transmission of the software and/or firmware update to the first network interface device 102. In an embodiment, the software/firmware end message is included in a field (e.g., an InfoField) of a training frame generated by the second network interface device 104 and transmitted to the first network interface device 102. For example, the software/firmware end message is included in an InfoField 204 of the training frame 200 of FIG. 2, in an embodiment. In another embodiment, the software/firmware end message is transmitted from the second network interface device 104 to the first network interface device 102 in other suitable manners.

At block 312, the second network interface device 104 receives, from the first network interface device 102 via the network link 106, an acknowledgement message indicating that the software/firmware end message transmitted by the second network interface device 104 at block 304 was successfully received by the first network interface device 102. In an embodiment, the acknowledgement message is included in a field (e.g., an InfoField) of a training frame received by the second network interface device 104 from the first network interface device 102. For example, the acknowledgement message is included in an InfoField field 204 of the training frame 200 of FIG. 2, in an embodiment. In another embodiment, the acknowledgement message is transmitted from the first network interface device 102 to the second network interface device 104 in other suitable manners. In some embodiments, the first network interface device 102 need not acknowledge successful receipt of the software/firmware end message, and the block 312 is therefore omitted.

Figure 4:
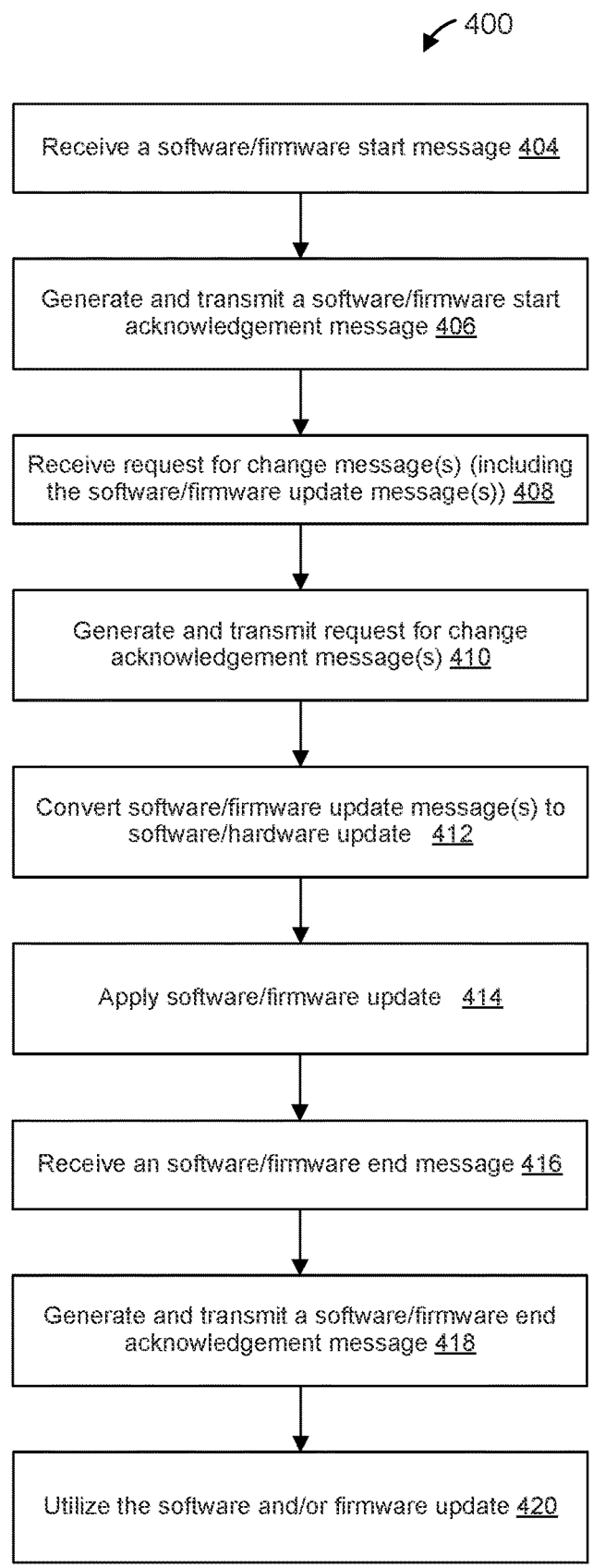
FIG. 4 is a flow diagram of an example method for receiving and implementing software and/or firmware updates transmitted to a first network interface device from a second network interface device over a network link during a link establishment process for establishing the network link, according to an embodiment.

FIG. 4 is a flow diagram of an example method 400 for receiving and implementing software and/or firmware updates transmitted to a first network interface device from a second network interface device over a network link during a link establishment process for establishing the network link, according to an embodiment. In an embodiment, the method 400 is implemented by the first network interface device 102 of the system 100 of FIG. 1, and the method 400 is described with reference to FIG. 1 for ease of explanation. In other embodiments, the method 400 is implemented by a suitable network interface device different from the first network interface device 102 of FIG. 1 and/or in a suitable system different from the system 100 of FIG. 1.

At block 404, the first network interface device 102 receives a software/firmware start message transmitted by the second network interface device 104 via the network link 106. The software/firmware start message indicates that the second network interface device 104 intends to initiate transmission of a software and/or firmware update to the first network interface device. In an embodiment, the software/firmware start message is included in a field (e.g., an InfoField) of a training frame transmitted by the second network interface device 104. For example, the software/firmware start message is included in a InfoField field 204 of the training frame 200 of FIG. 2, in an embodiment. In another embodiment, the software/firmware start message is transmitted from the second network interface device 104 to the first network interface device 102 in other suitable manners.

At block 406, the first network interface device 102 generates and transmits an acknowledgement message indicating that the software/firmware start message was successfully received by the first network interface device 102. In an embodiment, the acknowledgement message is included in a field (e.g., an InfoField) of a training frame generated and transmitted by the first network interface device 102 to the second network interface device 104. For example, the acknowledgement message is included in an InfoField field 204 of the training frame 200 of FIG. 2, in an embodiment. In another embodiment, the acknowledgement message is transmitted by the first network interface device 102 to the second network interface device 104 in other suitable manners. In some embodiments, the first network interface device 102 need not acknowledge successful receipt of the software/firmware start message, and block 406 is therefore omitted.

At block 408, the first network interface device 102 receives one or more software/firmware update request messages transmitted (e.g., at block 308 of FIG. 3) to the first network interface device 102 by the second network interface device 104 via the network link 106. In an embodiment, the one or more software/firmware update request messages are included in one or more fields (e.g., one or more InfoFields) of one or more training frames received the first network interface device 102 from the second network interface device 104 via the network link 106. For example, the one or more software/firmware update request messages are included in one or more InfoFields 204 of the training frame 200 of FIG. 2, in an embodiment. In another embodiment, the one or more software/firmware update request messages are transmitted from the second network interface device 104 to the first network interface device 102 in other suitable manners.

At block 410, the first network interface device 102 generates and transmits to the second network interface device 104 one or more acknowledgement messages via the network link 106. The one or more acknowledgement messages indicate whether the one or more software/firmware update request messages were successfully received by the first network interface device 102. In an embodiment, the one or more acknowledgement messages are included in one or more fields (e.g., one or more InfoFields) of one or more training frames generated by the first network interface device 102 and transmitted via the network link 106 to the second network interface device 104. For example, in an embodiment, the one or more acknowledgement messages are included in one or more InfoFields 204 of the training frame 200 of FIG. 2. In another embodiment, the one or more acknowledgement messages are transmitted by the first network interface device 102 to the second network interface device 104 in other suitable manners. In some embodiments, the first network interface device 102 need not acknowledge successful receipt of the one or more software/firmware update request messages, and block 410 is therefore omitted.

At block 412, the first network interface device 102 converts the one or more software/firmware update request messages received at block 408 to a software and/or firmware update. For example, the first network interface device 102 converts the one or more software/firmware update request messages received at block 408 to new software and/or firmware instructions to be used by the first network interface device 408, in an embodiment. The first network interface device 102 also determines, based on the one or more software/firmware update request messages received at block 408, indications (e.g., memory locations) of where the new software and/or firmware instructions that are to be applied in the first network interface device 102.

At block 414, the first network interface device 102 implements the software and/or firmware update. For example, the first network interface device re-writes one or more software and/or firmware instructions 142 in the memory 140 with the one or more new software and/or firmware instructions, inserts the one or more new software and/or firmware instructions at specific locations into the software and/or firmware instructions 142 in the memory 140, deletes one or more software and/or firmware instructions 142, stores now values to be used by one or more software and/or firmware instructions 142 in the memory 140, etc. In some embodiments, the first network interface device implements the software and/or firmware update by temporarily storing the software and/or firmware update in a volatile memory included in or coupled to the first network interface device 102, for example in an embodiment in which the first network interface device 102 is a flash-less or ROM-only device in which the software and/or firmware instructions 142 stored in the memory 140 cannot be directly altered.

At block 416, the first network interface device 102 receives a software/firmware update end message from the first network interface device 102 via the network link 106. The software/firmware end message indicates that the second network interface device 104 has completed transmission of the software and/or firmware update to the first network interface device 102. In an embodiment, the software/firmware end message is included in a field (e.g., an InfoField) of a training frame generated by the second network interface device 104 and transmitted to the first network interface device 102. For example, the software/firmware end message is included in an InfoField 204 of the training frame 200 of FIG. 2, in an embodiment. In another embodiment, the software/firmware end message is transmitted from the second network interface device 104 to the first network interface device 102 in other suitable manners.

At block 418, the first network interface device 102 generates and transmits to the second network interface device 104 an acknowledgement message via the network link 106. The acknowledgement message indicates whether the software/firmware end message was successfully received by the first network interface device 102. In an embodiment, the acknowledgement message is included in a field (e.g., an InfoField) of a training frame generated by the first network interface device 102 and transmitted via the network link 106 to the second network interface device 104. For example, the acknowledgement message is included in an InfoField field 204 of the training frame 200 of FIG. 2, in an embodiment. In another embodiment, the acknowledgement message is transmitted by the first network interface device 102 to the second network interface device 104 in other suitable manners. In some embodiments, the first network interface device 102 need not acknowledge successful receipt of the software/firmware end message, and the block 412 is therefore omitted.

At block 420, the first network interface device 102 utilizes the software and/or firmware update in order to complete the link establishment process for establishing the network link 106 and/or after completion of the link establishment process, such as during a data mode for communication with the second network interface device 104 via the network link 106.

Figure 5:
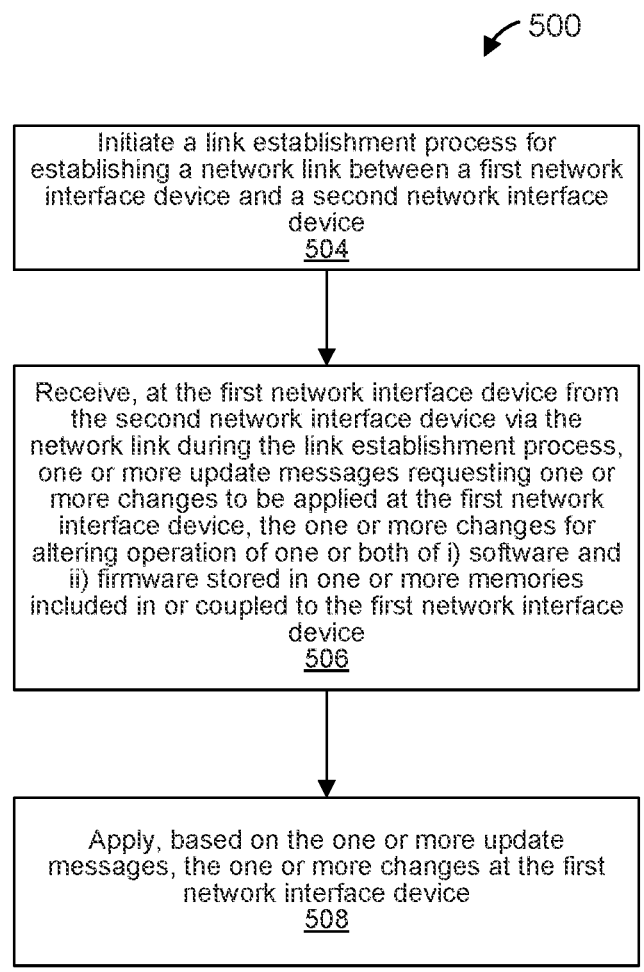
FIG. 5 is a flow diagram for performing software and/or firmware updates transmitted to a first network interface device from a second network interface device over a network link during a link establishment process for establishing the network link, according to an embodiment.

FIG. 5 is a flow diagram of a method 500 for performing software and/or firmware updates transmitted to a first network interface device from a second network interface device over a network link during a link establishment process for establishing the network link, according to an embodiment, according to another embodiment. In an embodiment, the method 500 is implemented by the first network interface device 102 of the system 100 of FIG. 1, and the method 500 is described with reference to FIG. 1 for ease of explanation. In other embodiments, the method 500 is implemented by a suitable network interface device different from the first network interface device 102 of the system 100 of FIG. 1 and/or in a suitable system different from the system 100 of FIG. 1.

At block 502, a link establishment process for establishing a network link between the first network interface device and a second network interface device is initiated at the first network interface device. For example, the link establishment controller 134 of the first network interface device 102 initiates a link establishment process for establishing a network link between the first network interface device and a second network interface device, in an embodiment. The link establishment process includes an auto-negotiation phase followed by a training phase, in an embodiment. The link establishment process omits an auto-negotiation phase, and begins with a training phase, in another embodiment.

At block 504, one or more update messages requesting one or more changes to be applied at the first network interface device are received by the first network interface device. In an embodiment, one or more update messages 166 are received by the first network interface device 102 from the second network interface device 104 via the network link 106. In another embodiment, one or more suitable messages different from the one or more update messages 166 are received via the network link 106. In an embodiment, the one or more messages are received by the first network interface device from the second network interface device via the network link between the first network interface device and the second network interface device during the link establishment process for establishing the network link between the first network interface device and the second network interface device. For example, the one or more update messages are received at least partially during the auto-negotiation phase of the link establishment process and/or during the training phase of the link establishment process. The one or more messages include new software and/or firmware instructions to be used for controlling operation of first network interface device, new settings (e.g., PHY settings) and/or new parameter values (e.g., PHY parameter values) to be used by the first network interface device, in various embodiments. In some embodiments, the one or more messages additionally include indications of times when the software/firmware updates are to be applied at the first network interface device, indications of specific software and/or firmware routines, software and/or firmware versions, etc., to which the software/firmware update is to be applied, etc. In some embodiments, the update messages additionally or alternatively include other information needed for software and/or firmware to properly control operation of the first network interface device, such as a MAC address needed by the network interface device for communication over the network link.

At block 506, the one or more changes are applied at the first network interface device. For example, the new software and/or firmware instructions to be used for controlling operation of first network interface device, the new settings (e.g., PHY settings) and/or new parameter values (e.g., PHY parameter values) to be used by the first network interface device are written to the memory in which the software and/or firmware instructions, etc. are persistently stored in the first network interface device. As another example, the new software and/or firmware instructions to be used for controlling operation of first network interface device, the new settings (e.g., PHY settings), new parameter values (e.g., PHY parameter values) to be used by the first network interface device, etc. are written to volatile memory included in or coupled to the first network interface device, for example in an embodiment in which the first network interface device is a flesh-less or a ROM-only network interface device. The new software and/or firmware instructions to be used for controlling operation of first network interface device, the new settings (e.g., PHY settings) and/or the new parameter values (e.g., PHY parameter values) are used for controlling operation of the first network interface device, for example for completion of establishing the network link between the first network interface device and the second network interface device and/or during a data mode for communication over the network link between the first network interface device and the second network interface device.

Figure 6:
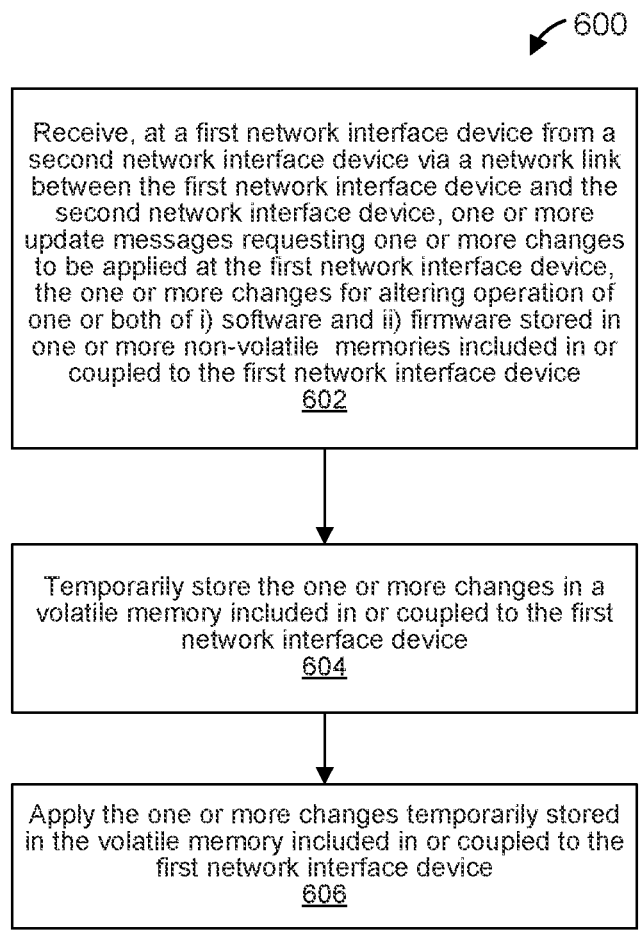
FIG. 6 is a flow diagram for performing software and/or firmware updates transmitted to a first network interface device from a second network interface device over a network link during a link establishment process for establishing the network link, according to another embodiment.

FIG. 6 is a flow diagram of a method 600 for performing software and/or firmware updates transmitted to a first network interface device from a second network interface device over a network link during a link establishment process for establishing the network link, according to another embodiment. In an embodiment, the method 600 is implemented by the first network interface device 102 of the system 100 of FIG. 1, and the method 600 is described with reference to FIG. 1 for ease of explanation. In other embodiments, the method 600 is implemented by a suitable network interface device different from the first network interface device 102 of the system 100 of FIG. 1 and/or in a suitable system different from the system 100 of FIG. 1.

At block 602, one or more update messages requesting one or more changes to be applied at the first network interface device are received at the first network interface device from a second network interface device via a network link between the first network interface device and the second network interface device. In an embodiment, the one or more changes are for altering operation of one or both of i) software and ii) firmware stored in one or more non-volatile memories included in or coupled to the first network interface device. In an embodiment, one or more update messages 166 are received by the first network interface device 102 from the second network interface device 104 via the network link 106. In another embodiment, one or more suitable messages different from the one or more update messages 166 are received from the second network interface device 104 via the network link 106. The one or more messages include new software and/or firmware instructions to be used for controlling operation of first network interface device, new settings (e.g., PHY settings) and/or new parameter values (e.g., PHY parameter values) to be used by the first network interface device, in various embodiments. In some embodiments, the one or more messages additionally include indications of times when the software/firmware updates are to be applied at the first network interface device, indications of specific software and/or firmware routines, software and/or firmware versions, etc., to which the software/firmware update is to be applied, etc. In some embodiments, the update messages additionally or alternatively include other information needed for software and/or firmware to properly control operation of the first network interface device, such as a MAC address needed by the network interface device for communication over the network link. In an embodiment, the one or more update messages are received by the first network interface device over the network link from the second network interface device each time the network link is established between the first network interface device and the second network interface device.

At block 604, the one or more changes are temporarily saved by the first network interface device in a volatile memory included in or coupled to the first network interface device. For example, the new software and/or firmware instructions to be used for controlling operation of first network interface device, the new settings (e.g., PHY settings) and/or new parameter values (e.g., PHY parameter values) to be used by the first network interface device are written to the memory in which the software and/or firmware instructions, etc. are written to the volatile memory included in or coupled to the first network interface device. The one or more changes are temporarily stored in the volatile memory, until power-down of the first network interface device, for example.

At block 606, the one or more changes temporarily stored in the volatile memory included in or coupled to the first network interface device are applied at the first network interface device. For example, the new software and/or firmware instructions to be used for controlling operation of first network interface device, the new settings (e.g., PHY settings) and/or the new parameter values (e.g., PHY parameter values) are used for controlling operation of the first network interface device. In an embodiment, applying the one or more changes at the first network interface device includes directing a processor of the first network interface device to execute the one or both of i) the one or more new software instructions and ii) the one or more new firmware instructions stored in the volatile memory. For example, in an embodiment, the first network interface device is configured to execute software and/or firmware instructions according to a jump table stored in a writable memory included in or coupled to the first network interface device, the jump table indicating locations of one or both of software instructions and firmware instructions stored in the one or more non-volatile memories included in or coupled to the first network interface device. In this embodiment, directing a processor of the first network interface device to execute the one or both of i) the one or more new software instructions and ii) the one or more new firmware instructions stored in the volatile memory includes updating the jump table to indicate locations of one or both of i) the one or more new software instructions and ii) the one or more new firmware instructions in the volatile memory. In other embodiments, the one or more changes temporarily stored in the volatile memory included in or coupled to the first network interface device are applied at the first network interface device are applied at the first network interface device in other suitable manners.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory coupled to the processor, such as a RAM, a ROM, a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for updating configuration of a first network interface device, the method comprising:
    initiating, at the first network interface device, a link establishment process for establishing a network link between the first network interface device and a second network interface device, the link establishment process including a training phase during which the first network interface device and the second network interface device exchange training signals;
    receiving, at the first network interface device from the second network interface device via the network link during the link establishment process, one or more update messages requesting one or more changes to be applied at the first network interface device, the one or more changes for altering operation of one or both of i) software and ii) firmware stored in one or more memories included in or coupled to the first network interface device; and
    applying, based on the one or more update messages, the one or more changes at the first network interface device.

2. The method of claim 1, wherein receiving the one or more update messages comprises receiving the one or more update messages at a physical layer (PHY) processor of the first network interface devices, the one or more update messages requesting one or more changes for altering operation of one or both of i) software and ii) firmware configured to control operation of the PHY processor of the first network interface device.

3. The method of claim 2, wherein receiving the one or more update messages includes receiving an update message that includes i) an indication of a PHY parameter to be updated at the first network interface device ii) a new value for the PHY parameter to be applied at the first network interface device and iii) an indication of a time at which the new value is to be applied at the first network interface device.

4. The method of claim 1, wherein receiving the one or more update messages comprises receiving the one or more update messages for debugging the one or both of i) software and ii) firmware stored in the one or more memories included in or coupled to the first network interface device.

5. The method of claim 1, wherein applying the one or more changes at the first network interface device includes
    generating, based on the one or more update messages, one or both of i) one or more new software instructions and ii) one or more new firmware instructions to be executed at the first network interface device, and
    writing the one or both of i) one or more new software instructions and ii) one or more new firmware instructions to the one or more memories included in or coupled to the first network interface device.

6. The method of claim 5, wherein
    the one or more memories included in or coupled to the first network interface device include one or more non-volatile memories and a volatile memory,
    the one or both of i) software and ii) firmware are stored in the one or more non-volatile memories, and
    applying the one or more changes at the first network interface device includes
        temporarily storing the one or both of i) the one or more new software instructions and ii) the one or more new firmware instructions in the volatile memory, and
        directing a processor of the first network interface device to execute the one or both of i) the one or more new software instructions and ii) the one or more new firmware instructions stored in the volatile memory.

7. The method of claim 1, wherein receiving the one or more update messages at the first network interface device comprises receiving the one or more update messages during an auto-negotiation phase of the link establishment process for establishing the network link between the first network interface device and the second network interface device, the auto-negotiation phase occurring prior to the training phase of the link establishment process for establishing the network link between the first network interface device and the second network interface device.

8. The method of claim 1, wherein receiving the one or more update messages at the first network interface device comprises receiving the one or more update messages during the training phase of the link establishment process for establishing the network link between the first network interface device and the second network interface device, including receiving a training frame that includes one or more fields that include the one or more update messages.

9. The method of claim 8, wherein the training frame comprises an infofield frame defined by an Ethernet protocol.

10. The method of claim 1, wherein applying, based on the one or more update messages, the one or more changes at the first network interface device comprises
    updating the one or both of i) software and ii) firmware at the first network interface device prior to completion of establishing the network link between the first network interface device and the second network interface device, and
    the method further comprises utilizing, by the first network interface device, the updated one or both of i) software and ii) firmware one or both i) in order to complete establishing the network link between the first network interface device and the second network interface device and ii) in a data mode after completion of establishing the network link between the first network interface device and the second network interface device.

11. The method of claim 1, further comprising, prior to applying the one or more changes at the first network device, authenticating the one or more update messages at the first network interface device.

12. A first network interface device, comprising
one or more memories storing instructions for operation of the first network interface device; and
an update controller implemented on one or more integrated circuit (IC) devices, configured to
receive, from a second network interface device via a network link between the first network interface device and the second network interface device, one or more update messages requesting one or more changes to be applied at the first network interface device, the one or more changes for altering operation of one or both of i) software and ii) firmware stored in one or more memories included in or coupled to the first network interface device, the one or more update messages being received during a link establishment process for establishing the network link between the first network interface device and a second network interface device, the link establishment process including a training phase during which the first network interface device and the second network interface device exchange training signals, and
apply, based on the one or more update messages, the one or more changes at the first network interface device.

13. The first network interface device of claim 12, wherein the update controller is configured to receive the one or more update messages requesting one or more changes for altering operation of one or both of i) software and ii) firmware configured to control operation of a physical layer (PHY) processor of the first network interface device.

14. The first network interface device of claim 13, wherein the update controller is configured to receive an update message that includes i) an indication of a PHY parameter to be updated at the first network interface device ii) a new value for the PHY parameter to be applied at the first network interface device and iii) an indication of a time at which the new value is to be applied at the first network interface device.

15. The first network interface device of claim 12, wherein the update controller is configured to receive the one or more update messages for debugging the one or both of i) software and ii) firmware stored in the one or more memories included in or coupled to the first network interface device.

16. The first network interface device of claim 12, wherein the update controller is further configured to apply the one or more changes at the first network interface device at least by
generating, based on the one or more update messages, one or both of i) one or more new software instructions and ii) one or more new firmware instructions to be executed at the first network interface device, and
writing the one or both of i) one or more new software instructions and ii) one or more new firmware instructions to the one or more memories included in or coupled to the first network interface device.

17. The first network interface device of claim 16, wherein
the one or more memories included in or coupled to the first network interface device include one or more non-volatile memories and a volatile memory,
the one or both of i) software and ii) firmware are stored in the one or more non-volatile memories, and
the update controller is configured to applying the one or more changes at the first network interface device at least by
temporarily storing the one or both of i) the one or more new software instructions and ii) the one or more new firmware instructions in the volatile memory, and
directing a processor of the first network interface device to execute the one or both of i) the one or more new software instructions and ii) the one or more new firmware instructions stored in the volatile memory.

18. The first network interface device of claim 16, wherein the update controller is configured to receive the one or more update messages during an auto-negotiation phase of the link establishment process for establishing the network link between the first network interface device and the second network interface device, the auto-negotiation phase occurring prior to the training phase of the link establishment process for establishing the network link between the first network interface device and the second network interface device.

19. The first network interface device of claim 12, wherein the update controller is configured to receive the one or more update messages during the training phase of the link establishment process for establishing the network link between the first network interface device and the second network interface device, the update controller being configured to receive a training frame that includes one or more fields that include the one or more update messages.

20. The first network interface device of claim 19, wherein the training frame comprises an infofield frame defined by an Ethernet protocol.

21. The first network interface device of claim 12, wherein the update controller is configured to
update the one or both of i) software and ii) firmware prior to completion establishing the network link between the first network interface device and the second network interface device, and
cause a PHY processor of the first network interface device to utilize the updated one or both of i) software and ii) firmware one or both of i) in order to complete establishing the network link between the first network interface device and the second network interface device and ii) in a data mode after completion of establishing the network link between the first network interface device and the second network interface device.

22. The first network interface device of claim 12, wherein the update controller is configured to, prior to applying the one or more changes at the first network device, authenticate the one or more update messages at the first network interface device.

* * * * *